(12) United States Patent
Lester et al.

(10) Patent No.: US 7,097,224 B2
(45) Date of Patent: Aug. 29, 2006

(54) INTEGRATED VEHICLE STORAGE ARRANGEMENT

(75) Inventors: Paul Lester, Commerce Township, MI (US); E. Mackey King, Howell, MI (US); Gerard Olszewski, Temperance, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 28 days.

(21) Appl. No.: 10/947,568

(22) Filed: Sep. 22, 2004

(65) Prior Publication Data

US 2006/0061117 A1     Mar. 23, 2006

(51) Int. Cl.
*B60J 7/00*     (2006.01)

(52) U.S. Cl. .................... 296/37.14; 296/37.6; 224/404

(58) Field of Classification Search ............... 296/37.1, 296/37.6, 37.14, 1.07; 224/402, 403, 404, 224/42.12, 42.2
See application file for complete search history.

(56) References Cited

U.S. PATENT DOCUMENTS

| | | | |
|---|---|---|---|
| 5,026,107 A * | 6/1991 | Hess | 296/37.2 |
| 5,636,890 A * | 6/1997 | Cooper | 296/37.1 |
| 6,129,401 A | 10/2000 | Neag et al. | |
| 6,155,625 A * | 12/2000 | Felix | 296/37.14 |
| 6,328,365 B1 | 12/2001 | Adsit | |
| 6,471,277 B1 * | 10/2002 | Scensny et al. | 296/37.6 |
| 6,550,837 B1 | 4/2003 | Preiss | |
| 6,883,851 B1 * | 4/2005 | McClure et al. | 296/37.14 |
| 2003/0098591 A1 | 5/2003 | Leitner et al. | |
| 2005/0248173 A1 * | 11/2005 | Bejin et al. | 296/37.1 |

* cited by examiner

*Primary Examiner*—Joseph D. Pape
(74) *Attorney, Agent, or Firm*—Thomas A. Jurecko

(57) ABSTRACT

An integrated storage arrangement for a vehicle having a cargo bed with a load floor positioned external to a passenger cab of the vehicle is provided. The storage arrangement includes an access opening positioned in the load floor of the cargo bed. A storage recess is positioned in relation to and accessible through the access opening. The storage recess includes a drain assembly and a container retention mechanism. A panel is moveably attached to the load floor of the cargo bed and is arranged to cover the access opening such that in a closed position, the cover is positioned substantially parallel to and flush with the cargo bed load floor.

12 Claims, 2 Drawing Sheets

INTEGRATED VEHICLE STORAGE ARRANGEMENT

FIELD OF INVENTION

The present invention relates generally to a storage arrangement for a motor vehicle, and, more particularly, to an integrated storage arrangement for a cargo bed of a motor vehicle.

BACKGROUND OF INVENTION

Generally, it is known to provide a cargo bed with a floor for a vehicle such as a pick-up truck. The cargo bed is typically rectangular in shape and has sides that in combination with the floor define a cargo carrying area. It is also generally known in the art to provide an external toolbox storage unit for the pick-up truck cargo bed. Such tool box storage units usually span the width of the pick-up truck bed and have a depth greater or equal to the depth of the sides of the cargo bed.

One disadvantage of the above toolbox storage unit is that it does not allow use of the full length of the pick-up truck bed. Another disadvantage is that the toolbox storage unit is not integrated with the truck bed and is also exposed to environmental elements. Yet another disadvantage of conventional toolbox storage units is that they are externally mounted to the bed and are therefore generally not removable nor portable.

Thus there is a need for a vehicle storage arrangement that overcomes the aforementioned and other disadvantages.

SUMMARY OF INVENTION

Accordingly, an integrated vehicle storage arrangement is provided for a vehicle having a cargo bed with a load floor positioned external to a passenger cab of the vehicle. In accordance with one aspect of the current invention, the integrated storage arrangement includes an access opening positioned in the load floor of the cargo bed. A storage recess is positioned in relation to and accessible through the access opening. The storage recess includes a drain assembly and a container retention mechanism. A panel is moveably attached to the load floor of the cargo bed and is arranged to cover the access opening such that in a closed position, the cover is positioned substantially parallel to and flush with the cargo bed floor.

In accordance with another aspect of the current invention, a removable storage container is provided having a base and a cover arranged to define an interior volume. The container is arranged to nest within the storage recess, and the container includes at least one projection positioned on the base of the container and arranged to engage the retention mechanism to retain the container in a predetermined position relative to the storage recess.

BRIEF DESCRIPTION OF DRAWINGS

Other aspects, features, and advantages of the present invention will become more fully apparent from the following detailed description of the preferred embodiment, the appended claims, and in the accompanying drawings in which:

DETAILED DESCRIPTION OF EXEMPLARY EMBODIMENT(S)

Figure 1:
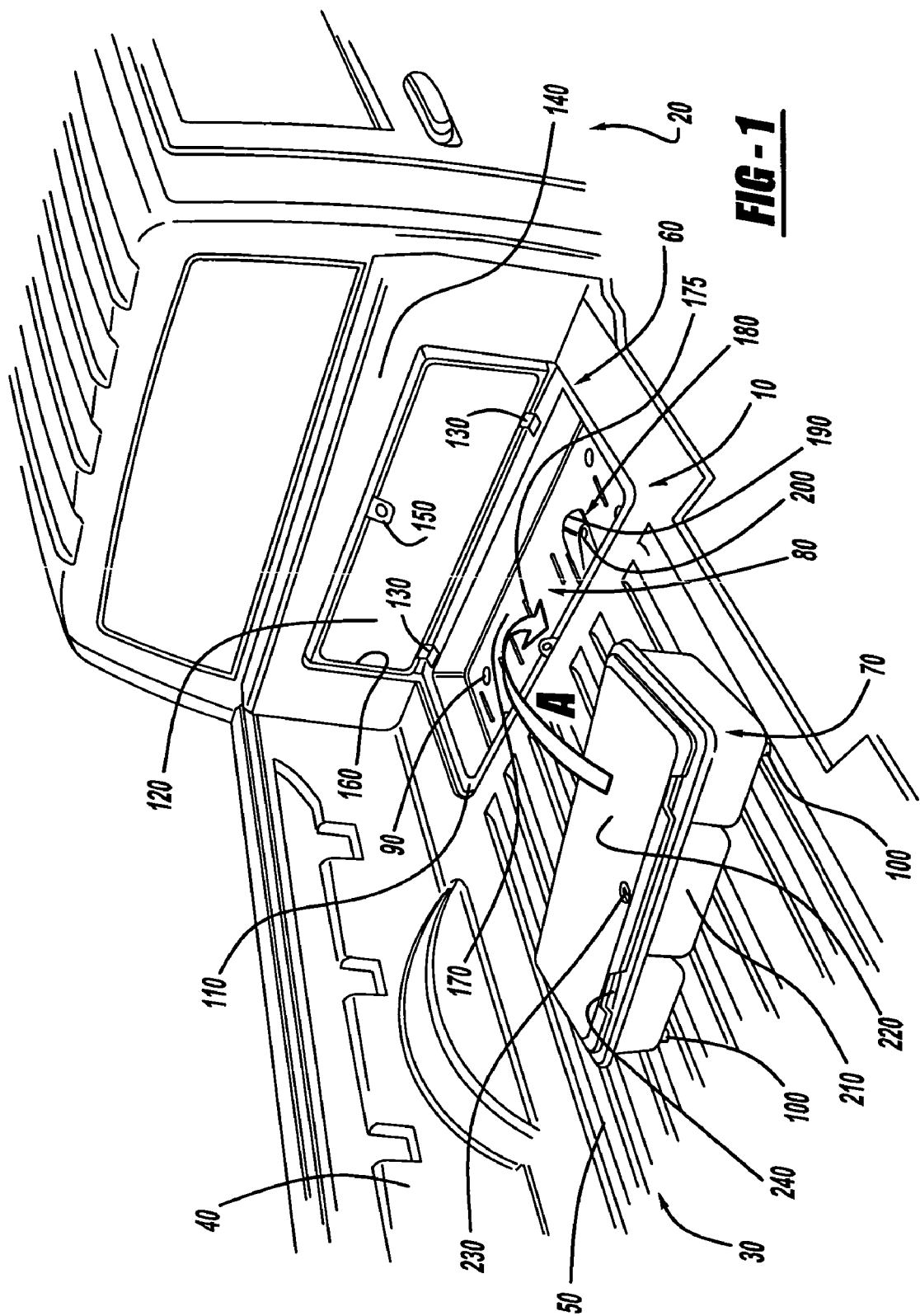
FIG. 1 illustrates an isometric view of an integrated storage arrangement including a storage recess and a storage container in accordance with the present invention.
Figure 2:
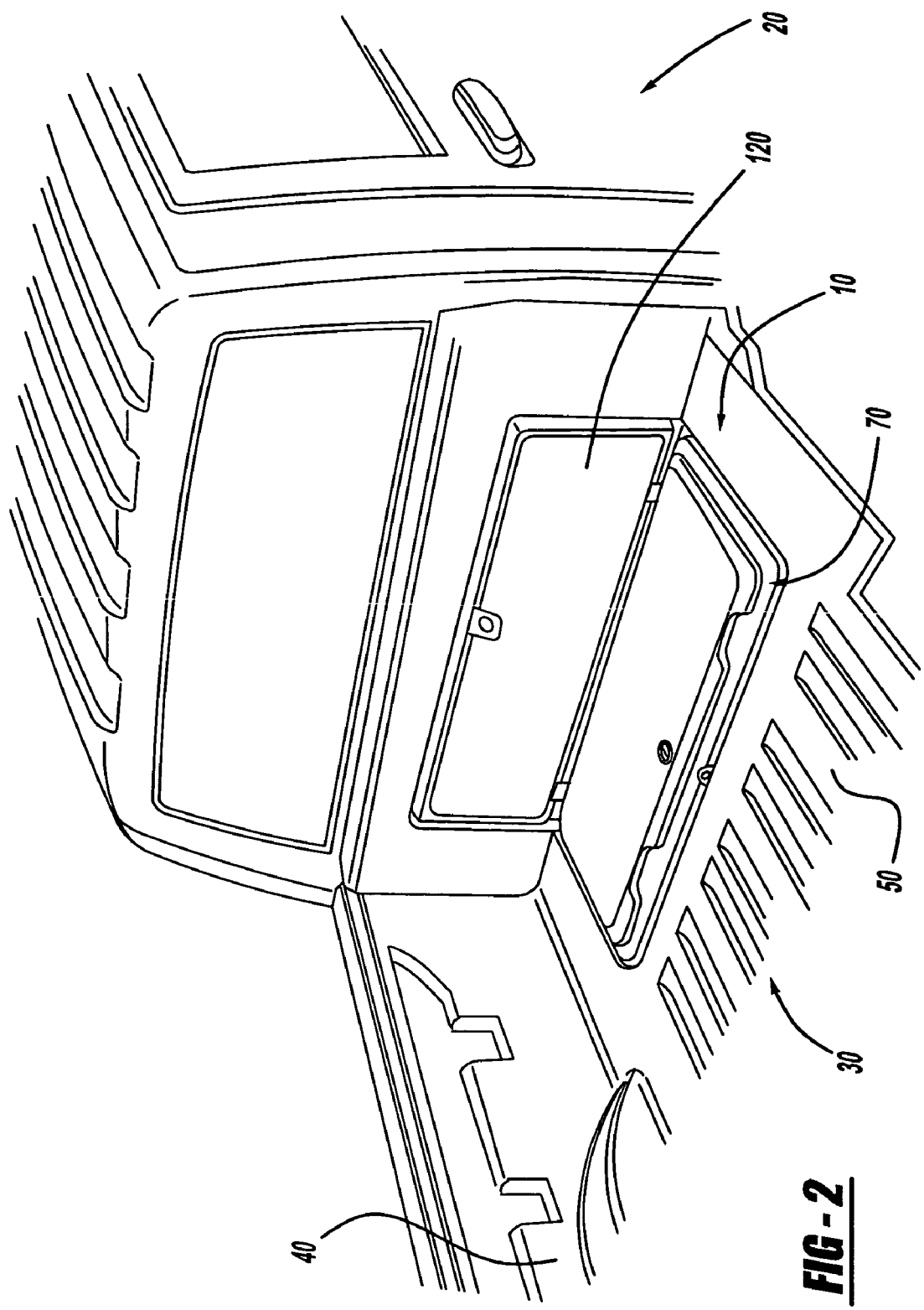
FIG. 2 illustrates an isometric view of the storage container nested in the storage recess in accordance with the present invention.

In the following description, several well-known features of a pick-up truck vehicle are not shown or described so as not to obscure the present invention. Referring now to the drawings, FIGS. 1 and 2 illustrate an exemplary embodiment of an integrated storage arrangement 10 in a pick-up truck 20 that is shown in a partial cut-away view. Pick-up truck 20 has a cargo bed 30 (shown in a partial cut-away view) with sides 40 and a load floor 50. Integrated storage arrangement 10 includes a storage volume 60 and a portable storage container 70. Storage volume 60 is preferable located at a forward end of cargo bed 30 as shown in FIG. 1. Storage volume 60 includes a preferably rectangularly shaped storage recess 80 in cargo bed 30 load floor 50. Storage recess 80 can be of varying sizes depending on style and size of a vehicle in which the recess is to be included. Storage recess 80 is also sized to accommodate portable storage container 70. Storage recess 80 includes four depressions 90 positioned at each corner of a floor of storage recess 80. Depressions 90 are arranged to receive four corresponding storage container legs 100 in a conventional snap fit or zero-clearance fit configuration.

Storage volume 60 further includes a shallow recess 110 and a cover panel 120. Shallow recess 110 is positioned in cargo bed load floor 50 around a perimeter of storage recess 80 and cover panel 120 is hingeably attached to a forward end or cabin side end of recess 110 through binges 130 as best shown in FIG. 1. Shallow recess 110 is arranged to receive cover panel 120 such that when cover panel 120 is pivoted to a closed position, cover panel 120 is parallel to and flush with cargo bed load floor 50. This flush configuration allows a user of the cargo bed area to slide objects along cargo bed load floor 50 to a forward end 140 of cargo bed 30 without having to lift the object over storage arrangement 10 (cover panel 120).

Cover panel 120 further includes a conventional key lock assembly 150 arranged to securely lock cover panel 120 to cargo bed floor 50. Preferably, key lock assembly would use the same key as is used for locking and unlocking passenger and driver vehicle doors. Cover panel 120 is also constructed so as to be a load bearing capable surface and not limit what can be conventionally loaded into the cargo bed of the pick-up truck. Cover panel 120 also includes a seal arrangement 160 positioned around an inside perimeter of cover panel 120. Seal arrangement 160 is preferably an elastomeric seal of the type used to seal a truck of a motor vehicle. However, it is recognized that other conventional seal arrangements may be used to seal cover panel 120 to cargo bed shallow recess 110. Seal 160 engages recess 110 when cover panel 120 is placed in a closed position.

Should any liquid enter recess 110, a floor 170 of recess 80 includes a drain assembly 180. Drain assembly 180 includes a depression 190 having a hole 200 positioned at a low point of depression 190 as shown in FIG. 1. Any liquid entering storage recess 80 will flow into drain assembly 180 and out of storage recess 80. In addition, storage recess 80 may include raised ribs 175 in floor 170. Ribs 175 are arranged to raise objects placed in storage recess 80 off of floor 170. If any liquid enters storage recess 80 or anything liquid being stored in storage recess 80 spills, objects being stored in storage recess 80 will not rest in or prevent the liquid from traveling to drain assembly 180.

Storage volume 60 can be used independently or in combination with storage container 70. Storage container 70 is a portable storage compartment arranged to be placed into storage volume 60 as shown in FIG. 1 by arrow A. As previously mentioned, storage container 70 includes legs 100 arranged to engage corresponding depressions 90 of storage volume 60 recess floor 170. Legs 100 are preferable constructed of a plastic or hard rubber material so as to minimize and relative vibration between storage container 70 and storage recess 80.

Storage container 70 includes a base 210 and a hingeably connected cover 220. Cover 220 further includes a conventional key lock assembly 230 such that cover 220 can be locked to base 210 to provide security when storage container 70 is removed from storage volume 60 and used in an independent, portable manner. Storage container 70 further includes handles in the form of molded undercuts 240 positioned in cover 220 so as to facilitate easy removal from storage recess 80. In addition, it is envisioned that the size or shape of portable storage container 70 shown in FIGS. 1 and 2 can vary with varying storage recess sizes and within a given storage recess size.

In operation, integrated storage arrangement 10 provides a multi function storage arrangement that does not interfere with a use of the pick-up truck cargo area. When the storage cover panel is in a closed position, the cover panel is flush with the cargo bed floor and thus does not inhibit full use of the cargo bed. For example, with this flush configuration, the storage arrangement does not prevent sliding heavy objects from a tailgate end of the cargo bed to a cab end of the cargo bed and require the heavy object to be lifted over the storage arrangement, such as if the storage container protruded above the cargo bed floor.

In addition, the storage volume can be used independently or with a portable storage container arranged to fit within the storage volume. The storage container is arranged to be easily removed from the storage volume and can be easily transported thus eliminating the need to utilize a separate box or crate to transport items from the vehicle such as if the storage container was permanently mounted to the vehicle and not portable.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An integrated vehicle storage arrangement for a vehicle having a cargo bed with a load floor positioned external to a passenger cab of the vehicle, the integrated storage arrangement comprising:

an access opening positioned in the load floor of the cargo bed;

a storage recess positioned in relation to and accessible through the access opening, the storage recess including a drain assembly and a container retention mechanism;

a panel moveably attached to the load floor of the bed and arranged to cover the access opening such that in a closed position, the cover is positioned substantially parallel to and flush with the cargo bed floor; and a removable storage container including a base and a cover arranged to define an interior volume, the storage container arranged to nest within the storage recess, and the storage container including at least one projection positioned on the base of the storage container and arranged to engage the retention mechanism to retain the storage container in a predetermined position relative to the storage recess.

2. The integrated vehicle storage arrangement of claim 1, wherein the container retention mechanism comprises at least one depression positioned in a floor of the storage recess and arranged to engage the at least one projection of the storage container.

3. The integrated vehicle storage arrangement of claim 2, wherein the at least one depression comprises four depressions and the at least one projection comprises four projections.

4. The integrated vehicle storage arrangement of claim 1, wherein the storage container is a plastic storage container.

5. The integrated vehicle storage arrangement of claim 1, wherein the storage container cover includes at least one handle arranged to facilitate removing the storage container from the storage recess and carrying the storage container.

6. The integrated vehicle storage arrangement of claim 5, wherein the at least one handle comprises two handles.

7. The integrated vehicle storage arrangement of claim 1, wherein the storage container cover comprises a key lock assembly, the key lock assembly arranged to lock the container cover to the container base.

8. The integrated vehicle storage arrangement of claim 1, wherein the panel further comprises a key lock assembly, the key lock assembly arranged to lock the panel to the load floor when the panel is in a closed position.

9. The integrated vehicle storage arrangement of claim 1, wherein the cover panel is hingeably connected to the load floor of the cargo bed.

10. The integrated vehicle storage arrangement of claim 1, wherein the drain assembly comprises a depression in a floor of the storage recess and an opening positioned in a low point of the depression.

11. The integrated vehicle storage arrangement of claim 1, wherein the storage recess further comprises projections positioned on a floor of the storage recess and arranged to maintain a spaced relation between the storage recess floor and an object placed in the storage recess.

12. The integrated vehicle storage arrangement of claim 1, wherein the panel further comprises a seal arranged to engage the cargo bed load floor when the panel is in a closed position.

* * * * *